US008761056B2

(12) United States Patent
Hyun et al.

(10) Patent No.: US 8,761,056 B2
(45) Date of Patent: Jun. 24, 2014

(54) SYSTEM FOR PROVIDING EMBMS CHATTING SERVICE AND SERVICE PROVIDER SERVER OF THE SAME, AND METHOD FOR CONTROLLING EBM-SC AND USER EQUIPMENT

(75) Inventors: Eun Hee Hyun, Daejeon (KR); Hochoong Cho, Daejeon (KR); Jung Mo Moon, Daejeon (KR); Dae Ik Kim, Daejeon (KR); Mi Young Yun, Daejeon (KR); Sang Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 193 days.

(21) Appl. No.: 13/242,948

(22) Filed: Sep. 23, 2011

(65) Prior Publication Data

US 2012/0099504 A1 Apr. 26, 2012

(30) Foreign Application Priority Data

Oct. 22, 2010 (KR) ........................ 10-2010-0103357

(51) Int. Cl.
*H04W 72/04* (2009.01)
*H04W 92/00* (2009.01)
*H04H 20/71* (2008.01)

(52) U.S. Cl.
USPC ........... 370/259; 370/254; 370/270; 370/312; 709/206; 455/3.01

(58) Field of Classification Search
USPC .......... 370/254, 259, 270, 312; 709/206, 204; 455/3.01
See application file for complete search history.

(56) References Cited

U.S. PATENT DOCUMENTS

| 6,788,667 | B1 * | 9/2004 | Beresin ........................ 370/338 |
| 7,522,911 | B2 * | 4/2009 | Ung et al. .................. 455/412.2 |
| 7,751,358 | B2 * | 7/2010 | Kuure et al. .................. 370/312 |
| 8,447,340 | B2 * | 5/2013 | Synnergren et al. .......... 455/518 |
| 8,583,086 | B2 * | 11/2013 | Lim et al. .................... 455/414.1 |
| 2007/0283403 | A1 * | 12/2007 | Eklund et al. .................. 725/117 |
| 2008/0247373 | A1 * | 10/2008 | Synnergren et al. .......... 370/340 |
| 2010/0057850 | A1 | 3/2010 | Kim et al. |

FOREIGN PATENT DOCUMENTS

| KR | 10-2009-0042928 | 5/2009 |
| KR | 10-2009-0072602 | 7/2009 |
| WO | 2007/082752 A1 | 7/2007 |

* cited by examiner

*Primary Examiner* — Ahmed Elallam
(74) *Attorney, Agent, or Firm* — Nelson Mullins Riley & Scarborough LLP; Anthony A. Laurentano, Esq.

(57) ABSTRACT

Disclosed is a system for providing an Evolved Multimedia Broadcast/Multicast Service (EMBMS) chatting service for providing a multi-chatting service. The system comprises at least one of a User Equipment (UE) to request establishment of a chatting channel and to transmit and receive a communication message and contents so as to transmit and receive the communication message with a plurality of mobile subscribers participated in the chatting channel, an evolved Broadcast Multicast-Service Center (eBM-SC) to perform control of an EMBMS service so as to transmit the communication message to the at least one of the UE using the EMBMS service, and a service provider server to transmit, to the eBM-SC, user service information, first bearer service information, and contents for each of the chatting channels, so that the UE transmits and receives the communication message with the plurality of the mobile subscribers participated in the chatting channel.

20 Claims, 8 Drawing Sheets

SYSTEM FOR PROVIDING EMBMS CHATTING SERVICE AND SERVICE PROVIDER SERVER OF THE SAME, AND METHOD FOR CONTROLLING EBM-SC AND USER EQUIPMENT

CROSS-REFERENCE TO RELATED APPLICATION

This application claims the benefit of Korean Patent Application No. 10-2010-0103357, filed on Oct. 22, 2010, in the Korean Intellectual Property Office, the disclosure of which is incorporated herein by reference.

BACKGROUND

1. Field of the Invention

The present invention relates to a system for providing an Evolved Multimedia Broadcast/Multicast Service (EMBMS) chatting service and a service provider server of the same, and a method for controlling an Evolved Broadcast Multicast Service Center (eBM-SC) and user equipment.

2. Description of the Related Art

In general, users using moving picture services or games may use a corresponding service, and at the same time use a chatting service with other users. In general, service providers may provide group chatting services to users through their own service servers, and services such as the group chatting services may be provided to mobile terminal users as well as to a fixed terminal. Accordingly, an environment in which communication messages transmitted through a single chatting channel uses a mobile communication network as a transmission network is supported.

In addition, from the standpoint of the service providers, since both a mobile subscriber and a wired subscriber use Internet protocol (IP) application software, the mobile subscriber and the wired subscriber may be the same in terms of service users except for a different data transfer medium.

Therefore, there is a demand for a method and system providing a chatting service through a single chatting channel regardless of whether a user is a mobile subscriber or a wired subscriber.

SUMMARY

An aspect of the present invention provides a system for providing an Evolved Multimedia Broadcast/Multicast Service (EMBMS) chatting service and a service provider server of the same, and a method for controlling an Evolved Broadcast Multicast Service Center (eBM-SC) and user equipment (UE), which may more effectively provide services when a service provider provides a group chatting service to mobile subscribers in a mobile communication environment having limited radio resources.

According to an aspect of the present invention, there is provided a system for providing an EMBMS chatting service for providing a multi-chatting service, the system including: at least one of a UE to request establishment of a chatting channel and to transmit and receive a communication message and contents so as to transmit and receive the communication message with a plurality of mobile subscribers participated in the chatting channel; an eBM-SC to perform control of an EMBMS service so as to transmit the communication message to the at least one of the UE using the EMBMS service; and a service provider server to transmit, to the eBM-SC, user service information, first bearer service information, and contents for each of the chatting channels, each being required for the control of the EMBMS service, so that the at least one of the UE transmits and receives the communication message with the plurality of the mobile subscribers participated in the chatting channel.

According to another aspect of the present invention, there is provided a method for controlling a service provider server, including: requesting an eBM-SC to register, as an EMBMS user service, an application service including a multi-chatting service in which a mobile subscriber and a wired subscriber participate; receiving an establishment request for a chatting channel from an UE desiring to use the multi-chatting service; requesting the eBM-SC to register an EMBMS bearer service to support participation of the mobile subscribers with respect to the chatting channel; receiving, from the eBM-SC, second bearer service information including at least one of a bearer service ID for the EMBMS bearer service, and an IP address and port for the EMBMS bearer service, the second bearer service information allocated for an EMBMS multicast bearer setting for the EMBMS bearer service; and receiving, from the eBM-SC, a signal informing that usage for the chatting channel is permitted so as to transmit and receive the communication message with the mobile subscriber through the chatting channel selected by the UE.

According to another aspect of the present invention, there is provided a method for controlling an eBM-SC, including: receiving, from a service provider server, first bearer service information for a request for registration of an EMBMS bearer service and the EMBMS bearer service, in response to a request for establishment of a chatting channel from an UE; generating second bearer service information required for providing the EMBMS bearer service, and allocating a resource for the EMBMS bearer service; performing an EMBMS activation procedure using EMBMS multicast bearer information in which the user service information, the first bearer service information, and the second bearer service information are integrated so that the UE receives a communication message using the EMBMS bearer service; immediately performing an EMBMS session procedure based on a service type indicator included in the first bearer service information; and informing the service provider server that usage of the chatting channel is permitted.

According to another aspect of the present invention, there is provided a method for controlling a UE, including: requesting a service provider server for establishment with respect to a chatting channel to use an application service including a multi-chatting service in which a mobile subscriber and a wired subscriber simultaneously participate; receiving an announcement with respect to an EMBMS bearer service from an eBM-SC providing an EMBMS service for the chatting channel; and uploading a communication message to the service provider server by selecting a chatting channel desired to participate in from a chatting channel list based on information acquired through the announcement.

Additional aspects, features, and/or advantages of the invention will be set forth in part in the description which follows and, in part, will be apparent from the description, or may be learned by practice of the invention.

Effect

According to a present invention, radio resources may be effectively used regardless of a number of participants in a limited radio resource environment by transmitting communication messages to mobile subscribers participating in a specific group chatting channel in a multicast type, using capability of multimedia broadcast/multicast services of a mobile communication system.

According to a present invention, when transmitting, to mobile subscribers, all communication messages of wireless and wired subscribers participating in a single chatting channel, various services may be more effectively provided to the mobile subscribers participating in a specific group chatting by transmitting the communication messages in a multicast type using an Evolved Multimedia Broadcast/Multicast Service (EMBMS) bearer by an Evolved Broadcast Multicast Service Center (eBM-SC).

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
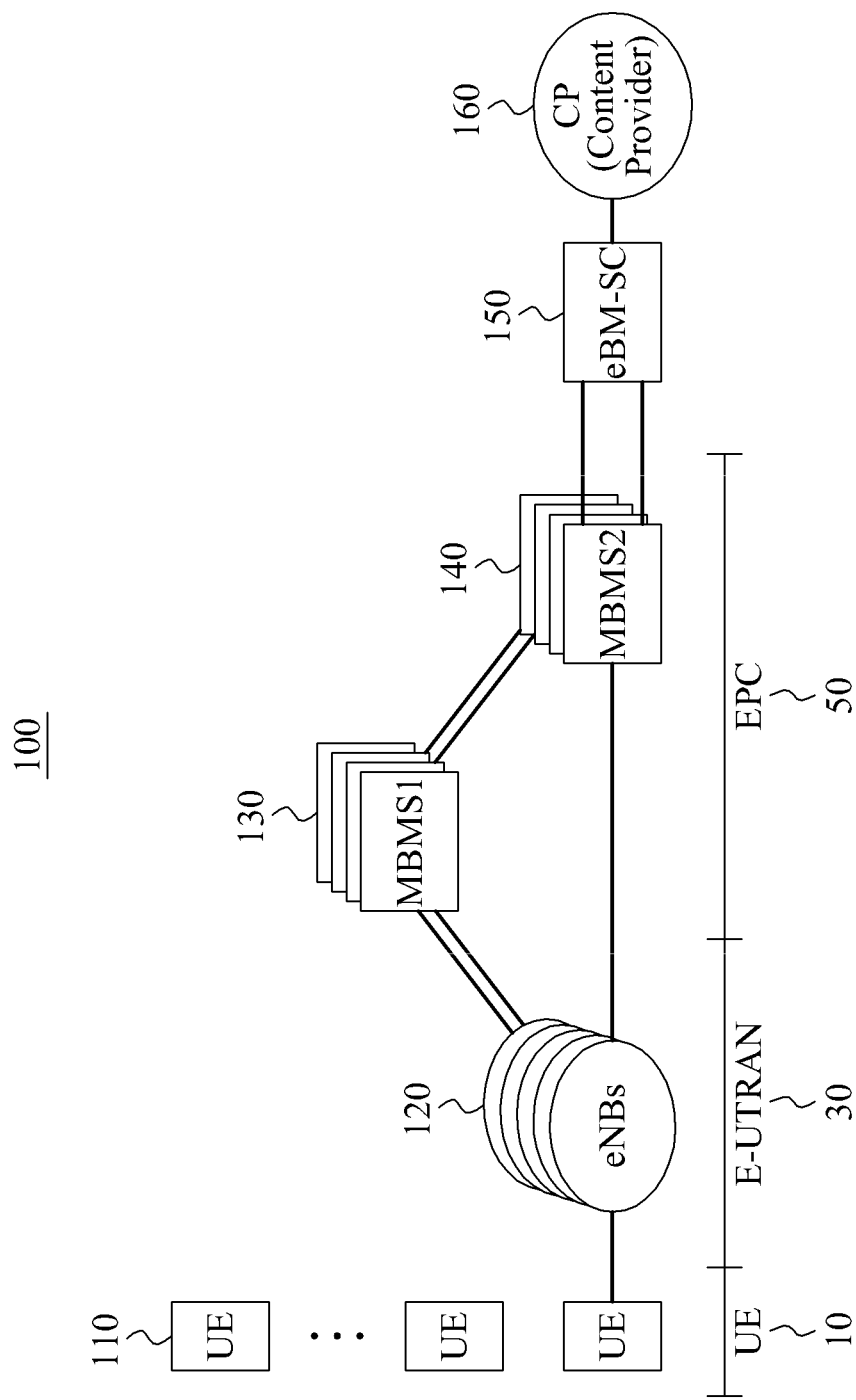
FIG. 1 is a diagram illustrating a configuration of a $3^{rd}$ Generation Partnership Project (3GPP) mobile communication network for providing an Evolved Multimedia Broadcast/Multicast Service (EMBMS) chatting service according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A chatting service may transmit, to terminals of all other participants, communication contents simultaneously inputted by users participating in a corresponding channel and accordingly, receives communication contents generated by N−1 number of other users as a maximum for each of the participants when a number of the participants is N.

A communication message generated by (N−1) number of peers as the other parties may be transmitted to a chatting server, and the chatting server may transmit the transmitted communication message to a participant group of the corresponding chatting channel. In this instance, the chatting server may transmit the communication message to the participant group of the chatting channel in a unicast or multicast transmission scheme.

When the unicast transmission scheme is used, the chatting server may copy an identical message to transmit the copied identical message to the participant group of the chatting channel (N−1)-th times. In contrast, when the multicast transmission scheme is used, the chatting server may transmit the identical message to all users included in the participant group of the chatting channel only one time.

The multicast transmission scheme may be a more efficient scheme, however, when using the multi-case transmission scheme, a network configuring a data transmission path from the chatting server to a terminal is the same multicast network using a specific multicast mechanism.

Also, in a case of a wired network, all routers included in the wired network do not have a multicast function of the same mechanism. In addition, when users participating in a corresponding chatting session are unspecified general users different from specified users, configuring a multicast environment due to a wide distribution area of the users and different capacities of networks accessed by the users is difficult.

Consequently, in the case of the multicast transmission scheme, since bundling, in a multicast, all users distributed in a wide area to provide services is difficult, the chatting service may be provided using the unicast transmission scheme instead of constructing a separate multicast network for a multicast application.

In the case of the wired network, since no influence on a capacity and performance are observed even when transmitting the communication message using the unicast transmission scheme, service deployment may be facilitated. However, in a case of a mobile communication network, limited wireless resources may cause adverse effects on the service performance when a number of services simultaneously performed become larger, and a number of users participating in each service become larger.

In the case of the mobile communication network, since wireless resources used for data transmission in a wireless section between a base station and a user terminal (UE) are limited, services are provided using minimum resources. Thus, according to an embodiment, the multicast transmission scheme that may receive, through the transmission of a single time, contents or communication messages in which all users included in the participant group of the chatting channel desire to receive.

In the case of the mobile communication network, network nodes configuring a mobile communication system may transmit all data by generating and controlling a data transmission bearer. That is, since all nodes to be included in a data transmission path in the mobile communication network are under a control of a single system, a specific transmission mechanism is applied to the mobile communication network, rather than applied to the wired network, and may be more efficient.

To effectively provide more services using wireless resources having been already limited, a $3^{rd}$ Generation Partnership Project (3GPP) mobile communication network may provide a service capability such as Evolved Multimedia Broadcast/Multicast service (EMBMS) to thereby support a multicast and broadcast data transmission to be enabled.

The EMBMS may control a multicast/broadcast transmission of data by an Evolved Broadcast Multicast Service Center (eBM-SC) of a service control node, and may transmit data in which the multicast/broadcast transmission is required.

In addition, the EMBMS may be a service support mechanism in which a setting function of a multicast/broadcast transmission path and a management function of the wireless resources are added to a packet core network and a radio access network, and may define, in the wireless section, a separate physical channel only for the multicast/broadcast transmission, whereby a plurality of UEs can simultaneously receive data transmitted single time in eNB.

UEs participating in an arbitrary multicast service simultaneously receive data transmitted through a specific radio channel, and thereby services may be provided through the transmission of a single time in the wireless section.

When using the EMBMS, the above described multicast transmission capacity may be provided to the mobile communication system. However, when an application used in the wired network is applied as is in receiving an application simultaneously maintaining a plurality of chatting channels, the mobile communication system does not use an MBMS service capability. In addition, since the application used in the wired network is received in the mobile communication system in a type in which an application service is provided through a default bearer for a data service, the application used in the wired network may not use a data transmission mechanism of a multicast type.

FIG. 1 is a diagram illustrating a configuration of a 3GPP mobile communication network for providing an EMBMS chatting service according to an embodiment of the present invention.

Referring to FIG. 1, the 3GPP mobile communication network includes a UE Network 10, an Evolved Universal Mobile Telecommunications Network Terrestrial Radio Access Network (E-UTRAN) 30 including a plurality of evolved nodeBs (eNBs) 120, and an Evolved Packet Core (EPC) 50 to control an EMBMS session to be interlocked with the E-UTRAN 30 and to transmit and receive traffic from the outside of a network.

In addition, a system 100 for providing an EMBMS service that may enable the multicast/broadcast transmission based on the 3GPP mobile communication network such as a wideband code division multiple access (W-CDMA) network may include at least one UE 110, the plurality of eNBs 120, an MBMS1 130, an MBMS2 140, an eBM-SC 150, and an external Content Provider (CP) 160.

The E-UTRAN 30 may include the plurality of eNBs 120, receive uplink signals transmitted from the plurality of UEs 110 in a physical layer level, and transmit downlink signals to the plurality of UEs 110.

The plurality of eNBs 120 may transmit and receive signals to and from the plurality of UEs 110, act as an access point of the plurality of UEs 110, and manage radio resources of a cell unit, thereby communicating with the plurality of UEs 110 existing in a corresponding cell through a radio channel.

The EPC 50 may manage the MBMS1 130 performing a session control function in the mobile communication network and an MBMS traffic path so as to support an EMBMS service, and transmit traffic through a set trafficpath. Also, the EPC 50 may include the MBMS2 140 performing an MBMS gateway function as a network element.

The EPC 50 may set an EMBMS multicast bearer for the EMBMS service to be interlock with the plurality of eNBs 120 of the E-UTRAN 30, and transmit contents to the plurality of UEs 110 through the setting of the EMBMS multicast bearer.

The plurality of UEs 110 may receive a broadcast type multimedia content packet, and the plurality of eNBs 120 may perform radio resource management, radio channel setting, and the like for wireless transmission with the plurality of UEs 110. The eBM-SC 150 may perform a control for providing an EMBMS service.

The above described components of the network, that is, a UE among the plurality of UEs 110, the plurality of eNBs 120, and the eBM-SC 150 may perform a session for transmitting the contents received from the CP 160, and bearer setting and management, whereby multimedia contents may be simultaneously transmitted to the plurality of UEs 110 at a designated point in time through the transmission of a single time.

In this instance, the CP 160 may further include a Service Provider (SP) providing contents together with separate service logic.

Meanwhile, the eBM-SC 150 may be a node controlling an EMBMS service control, and may be a subject of management and control with respect to the EMBMS service. The eBM-SC 150 may perform an EMBMS session start procedure or an EMBMS session stop procedure to manage start and end with respect to all EMBMS services of the broadcast type or the multicast type.

In this instance, the plurality of eNB 120 may perform a setting process of the EMBMS bearer to which actual contents are to be transmitted, and each of the EMBMS bearers may be allocated to use resources based on a bearer transmission capacity, Quality of Service (QoS) information, and the like in accordance with characteristics of the contents.

In a case of a multicast service, the eBM-SC 150 may configure a multicast tree for transmitting, to the plurality of UE 110, data to be transmitted by a corresponding service by receiving a multicast join message from a UE among the plurality of UEs 110. The multicast tree may be configured through an EMBMS activation procedure.

Figure 2:
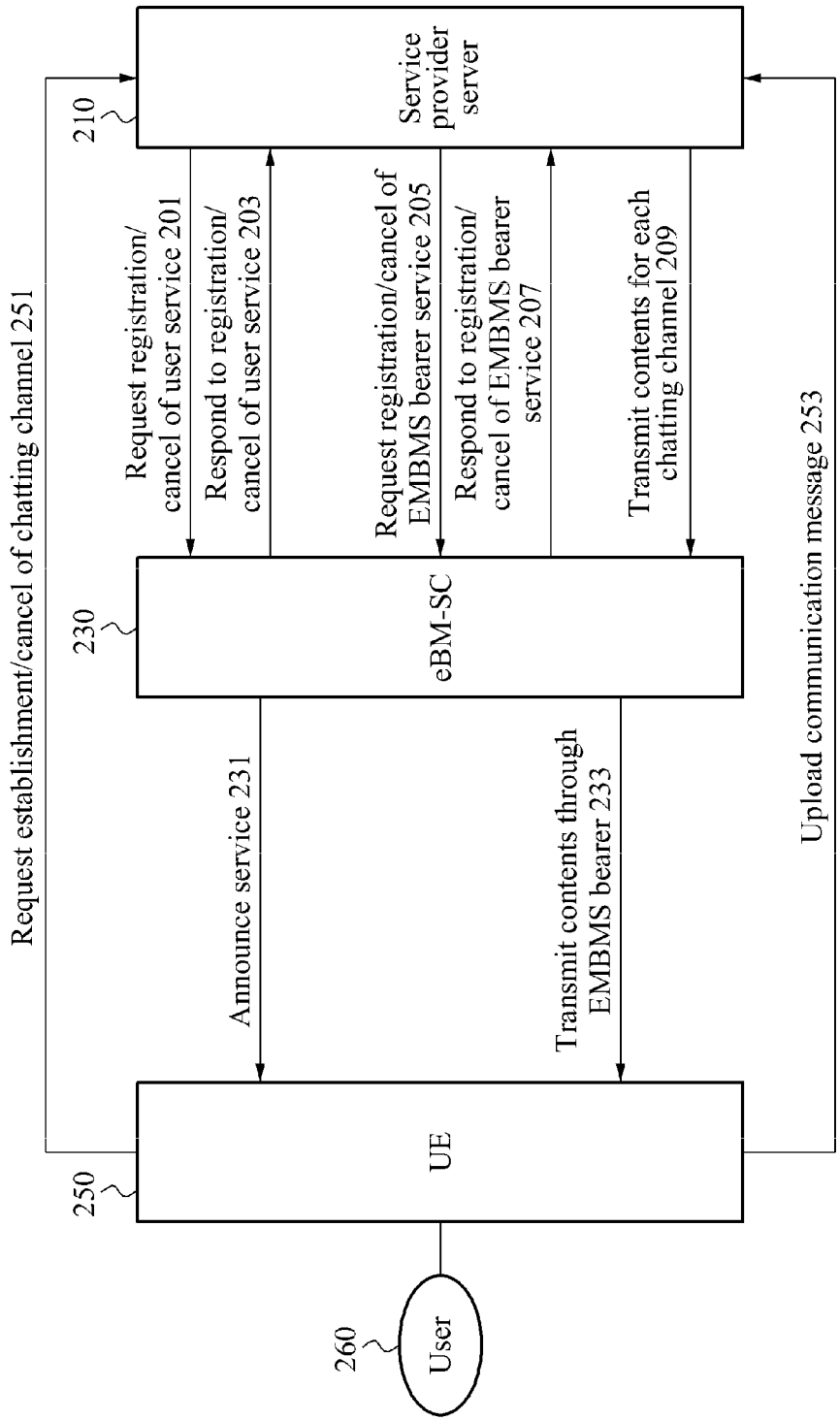
FIG. 2 is a diagram illustrating a configuration and operations of a system for providing an EMBMS chatting service to provide a multi-chatting service according to an embodiment.

During the EMBMS activation procedure, lower nodes may be registered in upper nodes such that a passage to (*"the UE among"?*) the plurality of UE 110 passes through the lower nodes, and each of the eBM-SC 150, the MBMS2 140, the MBMS1 130, the plurality of eNB 120, and the plurality of UEs 110 may generate UE contents with respect to the corresponding EMBMS service. FIG. 2 is a diagram illustrating a configuration and operations of a system for providing an EMBMS chatting service to provide a multi-chatting service according to an embodiment of the present invention.

In FIG. 2, the system for providing the EMBMS chatting service includes a service provider server 210, an eBM-SC 230, and at least one of a UE 250.

The service provider server 210 may be a node involved in a level of the CP 160 in a structure of the system 100 for providing the EMBMS service illustrated in FIG. 1, and provide contents together with an application service to the UE 250.

The service provider server 210 may provide application services simultaneously including a plurality of chatting channels, and users 260 may access the service provider server 210 through the UE 250 to use a corresponding service.

The UE 250 may include both a fixed terminal connected to a wired network and a mobile equipment. However, assuming that the fixed equipment is operated in a generally supported method, only the mobile terminal will be described.

The UE 250 according to an embodiment may denote a mobile terminal having EMBMS service capability provided in the mobile communication system.

The UE 250 may be in a state of having already been registered in a corresponding service provider server 210, and may be a mobile terminal carried by a user to which usage for the multi-chatting service or other application services including the multi-chatting service is allowed.

An arbitrary user 260 may generate a new chatting channel to use the multi-chatting service, or participate in an existing chatting channel. In the case of generating the new chatting channel, in operation 251, the user 260 may request the service provider server 210 through the UE 250 for establishment or cancelation of the chatting channel.

In the case of participating in the existing chatting channel, in operation 253, the user 260 may select, from a chatting channel list, a chatting channel desired to be participated in to upload a communication message of the user 260, and to receive communication messages of other participants, thereby participating in a group communication.

The UE 250 may request the service provider server 210 about establishment of the chatting channel to transmit and receive the communication message with a plurality of mobile subscribers participating in the chatting channel, and transmit and receive the communication message and contents.

So that the UE 250 uses services provided by the SP, an operation of registering in the service provider server 210 or driving services, an operation of requesting establishment and cancel of the chatting channel for the group chatting, an operation of transmitting the communication message on a specific chatting channel, and the like may be directly connected to the service provider server 210 through a default bearer of the mobile communication system, and may be performed.

However, a download packet transmitted for transmitting, to other participants, the communication messages uploaded through a single chatting channel by the UE 250 may be transmitted through an EMBMS multicast bearer.

So that at least one of the UE 250 transmits and receives the communication message with a plurality of mobile subscribers participating in the chatting channel, the service provider server 210 may transmit, to the eBM-SC 230, user service information, first bearer service information, and contents for each chatting channel which are required for controlling an EMBMS service, that is, setting the EMBMS multicast bearer.

The service provider server 210 may cooperate with the eBM-SC 230 of an EMBMS service control node enabling multicast data transmission of the mobile communication network so as to transmit data, for example, communication message, contents, and the like, in the multicast scheme.

When the communication messages are uploaded from the UEs, the service provider server 210 may transmit a corresponding communication message to participants participating in the chatting channel.

In operation 201, the service provider server 210 may request the eBM-SC 230 about traffic transmission for the sake of the mobile subscribers included in the participants. In this instance, the service provider server 210 may provide information required by the eBM-SC 230 so as to control the EMBMS service in addition to simply providing a data packet to the eBM-SC 230.

Here, the information required by the eBM-SC 230 may configure a multicast tree for a data transmission path from the service provider server 210 to the UE 110, and may be used to generate an EMBMS multicast bearer according to the data transmission path when an actual data packet is generated.

The eBM-SC 230 may be a control node for the EMBMS service enabling data transmission of the multicast/broadcast type in the mobile communication network, and manage an EMBMS session for providing the EMBMS multicast bearer service to the at least one of the UE 250.

The eBM-SC 230 may control an Internet Protocol (IP) packet received from the service provider server 210 to be transmitted through the EMBMS multicast bearer among unique transmission bearers of the mobile communication network, and transmit actual traffic.

The eBM-SC 230 may be appropriately interlocked with the UE 250 to transmit a data packet from the service provider server 210, using EMBMS service control procedures.

In the interlocked process, a plurality of nodes constituting the EPC 50 and the E-UTRAN 30 of FIG. 1 may be integrally interlocked with each other, and transmit, to the UE 250 through the EMBMS multicast bearer, data transmitted from the service provider server 210.

In operation 201, the service provider server 210 may register a corresponding service in the eBM-SC 230 before service starts so as to provide a chatting service using the EMBMS service of the mobile communication network. In operation 203, the service provider server 210 may cancel the service registration at a point in time when the corresponding service is no longer used.

The registration and cancel process may be a procedure corresponding to a service subscription operation of an EMBMS service standard of the 3GPP standard. Through the registration and cancel process, the eBM-SC 230 may store data provided in an EMBMS user service registration operation and an EMBMS bearer service registration operation so that the stored data is used in an EMBMS multicast bearer setting operation later, and may allocate resource information such as information about a bearer service identifier (ID), information about an IP multicast address and port, with respect to the EMBMS bearer service, that is, second bearer service information for the EMBMS multicast bearer.

A single EMBMS user service may include a plurality of EMBMS multicast bearer services according to the 3GPP standard.

The user service in which the service provider server 210 requests the eBM-SC 230 to register/cancel in operations 201 and 203 may be the EMBMS user service, and may denote a unit service provided to users, for example, a streaming service such as showing a video, on-line game service, and the like.

The multi-chatting service may be provided to the UE 250 in a type of being combined with the above described EMBMS user service, or defined in a type of a separate EMBMS user service simply for the purpose of the group chatting to thereby be provided. In any case, different EMBMS multicast bearers are generated for each of the chatting channels to thereby download the communication message to the UE 250.

The service provider server 210 may register an application service including the multi-chatting channel service as the EMBMS user service. In this instance, in operation 201, the service provider server 210 may transmit, to the eBM-SC 230, user service information including at least one of a service name, a service type indicator indicating a real-time EMBMS bearer service registration and bearer activation is to be performed, a type and characteristics of contents transmitted through service, and a participant list to use a corresponding service.

The eBM-SC 230 receiving the registration request with respect to the EMBMS user service may store, in a database (DB), corresponding service information to be used in the EMBMS service control procedure. When receiving a cancel request with respect to the EMBMS user service from the service provider server 210, the eBM-SC 230 may delete the corresponding user service from the DB.

The eBM-SC 230 may designate a service type ascertained from the service type indicator based on the user service information, and store the designated service type in the DB.

Here, the service type may indicate whether registration with respect to a separate EMBMS multicast bearer service to be used for each channel in the chatting channel establishment procedure later is performed in real-time. In addition, the service type indicator may be an indicator indicating the EMBMS multicast bearer setting procedure immediately after registration of the EMBMS bearer service is to be performed.

In operation 203, the eBM-SC 230 may generate a unique user service ID for identifying the corresponding EMBMS user service, and return the generated user service ID to the service provider server 210 together with the service registration result.

When receiving the cancel request with respect to the EMBMS user service from the service provider server 210, the eBM-SC 230 may collect resources allocated in the registration procedure, and transmit the collected result to the service provider server 210. The transmission of the collected result to the service provider server 210 may be omitted as necessary.

When an arbitrary user requests the service provider server 210 about establishment of the chatting channel in operation 251 while the EMBMS user service registered in the eBM-SC 230 by the service provider server 210 is proceeded, the service provider server 210 may provide, to the eBM-SC 230, first bearer service information through the registration request of the EMBMS bearer service to be used for the establishment of the chatting channel in operations 205 and 207. Substantially, in operations 205 and 207, a real-time EMBMS bearer service registration procedure may be performed.

In operation 205, the service provider server 210 may transmit, to the eBM-SC 230, first bearer service information including at least one of a user service ID for identifying an EMBMS user service in the EMBMS bearer service registration request, a name of the EMBMS bearer service and a type of data to be transmitted through the EMBMS bearer service, a service area to which the EMBMS bearer service is applied, and a service type indicator instructing to perform the real-time EMBMS bearer activation procedure. Here, the user service ID may be determined using information received from the eBM-SC 230 by a response from the eBM-SC 230 in operation 203. As the type of the data to be transmitted through the EMBMS multicast bearer service, texts, images, videos, and the like may be used.

In general, the eBM-SC 230 may specify a specific time at EMBMS bearer activation start and end points in time when registering the EMBMS bearer service. However, in a case of establishment of the chatting channel, the eBM-SC 230 according to an embodiment may use the service type indicator indicating that it is necessary to perform the real-time EMBMS bearer activation procedure, so that the EMBMS bearer activation procedure is performed immediately after receiving the registration request for the EMBMS bearer service, and an EMBMS bearer deactivation procedure is performed when a corresponding chatting channel is dropped.

The eBM-SC 230 may allocate second bearer service information including at least one of information on a bearer service ID and information on an IP multicast address and a port, which are used for transmitting the communication message among participants of a corresponding chatting channel, and store, in its own DB, the allocated second bearer service information and the first bearer service information received from the service provider server 210. In this instance, the eBM-SC 230 may internally generate or allocate various types of information required for the EMBMS bearer setting procedure. However, the generation or allocation of the information may be inherent functions of the eBM-SC 230 and thus, further description thereof will be omitted.

In operation 207, the eBM-SC 230 may immediately perform the EMBMS bearer activation procedure using the user service information, the first bearer service information, and the second bearer service information generated by the eBM-SC 230, and respond, to the service provider server 210, the second bearer service information together with results of the performed EMBMS bearer activation procedure.

When canceling the chatting channel proceeded by the user 260, the service provider server 210 may request the eBM-SC 230 about the cancel with respect to the corresponding EMBMS multicast bearer service, using the information on the user service ID received in operation 203 and the information on the bearer service ID received in operation 207.

When receiving the cancel request for the EMBMS bearer service from the service provider server 210, the eBM-SC 230 may delete information on the corresponding EMBMS bearer service from the DB, and return, to the service provider server 210, the deleted result. The returning of the deleted result may be omitted, as necessary.

The eBM-SC 230 may inform the UE 250 and unspecified users of generation of a new chatting channel and information on the new chatting channel to thereby enable a user to select a chatting channel desired to participate in.

When the user 260 uses a specific chatting channel to participate in the chatting, an EMBMS service client mounted in the UE 250 may transmit a multicast join message to the system for providing the EMBMS chatting service.

When the MBMS2 140 included in the EPC 50 of FIG. 1 receives the multicast join message from the UE 250, the MBMS2 140 may be interlocked with the eBM-SC 150 and the plurality of eNBs 120, and may proceed a procedure of constructing an EMBMS multicast tree constituting a multicast transmission path for data transmission.

A user establishing a chatting channel or the user 260 selecting a specific chatting channel to participate in a chatting may input a communication message through his UE 250, and receive communication messages of other participants.

In this instance, the communication message inputted by the user 260 may be transmitted to the service provider server 210 through a default bearer of the mobile communication network in operation 253, and the service provider server 210 may transmit, to the eBM-SC 230, the communication message to transmit a corresponding communication message to a mobile subscriber among users participating in a corresponding chatting channel in operation 209. The handling for the mobile subscribers may be performed through the EMBMS multicast bearer, and the handling for existing wired subscribers may be performed in an existing scheme.

The service provider server 210 may transmit, to the eBM-SC 230, the data packet including a corresponding communication message using a multicast packet having the IP multicast address and port number obtained in operation 207. In addition, the service provider server 210 may encapsulate the multicast packet into a unicast packet to thereby transmit the encapsulated multicast packet to the eBM-SC 230 as a destination, or simply transmit, to the eBM-SC 230 as the destination, the encapsulated multicast packet by the unicast packet.

The packet transmitted to the eBM-SC 230 may be transmitted to the UE 250 through the EMBMS multicast bearer activated in the EMBMS bearer service registration process, between operations 205 and 207, and at least one UE 250 may receive the same information through a single radio channel through which corresponding information is transmitted.

Figure 3:
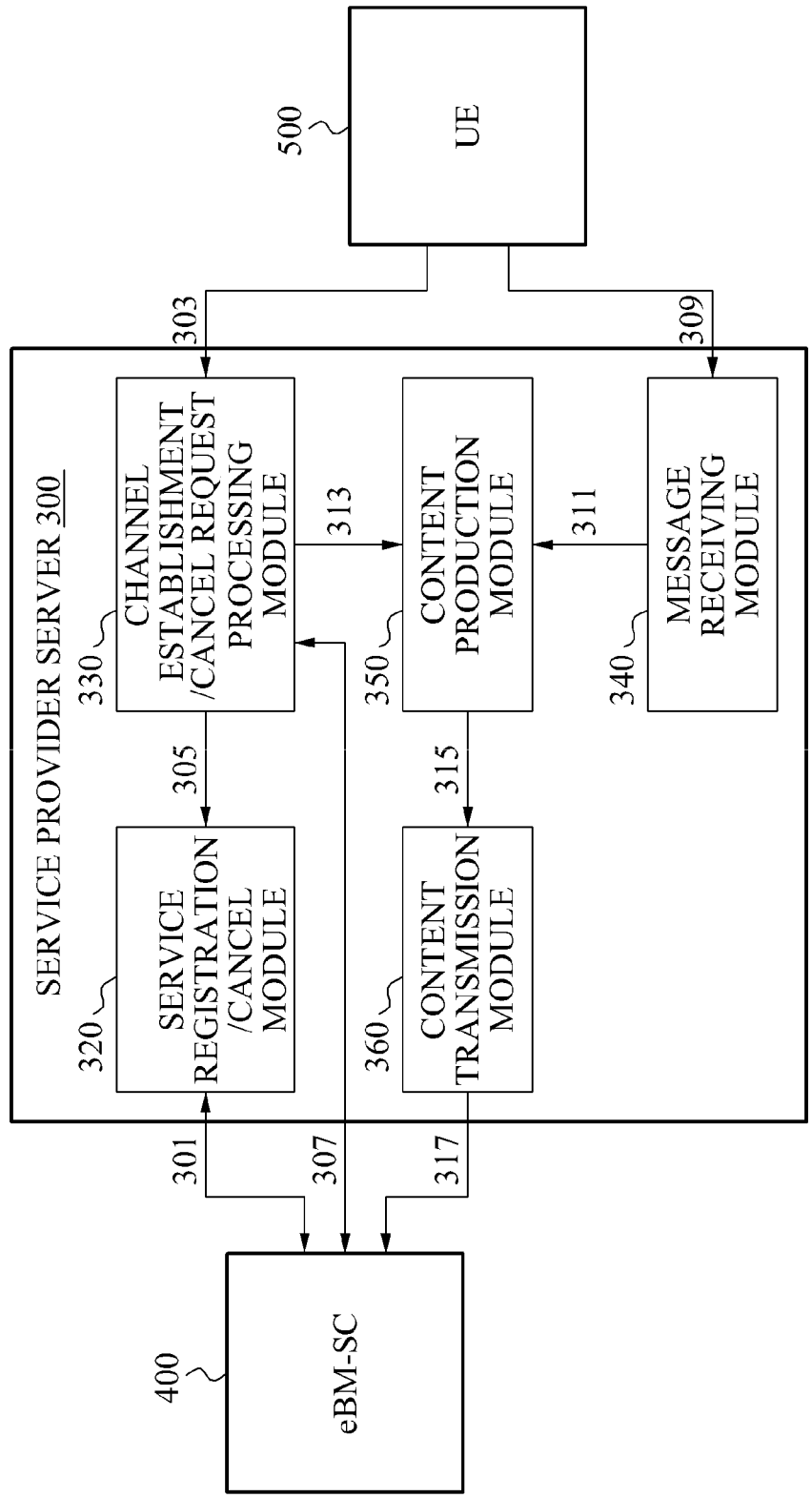
FIG. 3 is a diagram illustrating a service provider server according to an embodiment.

FIG. 3 is a diagram illustrating a service provider server 300 according to an embodiment.

Referring to FIG. 3, the service provider server 300 may include functions required for supporting a multi-chatting service, and may include functional modules for providing an inherent function of the service provider or other services.

Here, the service registration may be an operation performed at an arbitrary point in time before a corresponding service is substantially performed, and may be a function of registering the EMBMS user service and the EMBMS bearer service to use a multicast transmission function of the mobile communication system.

The service cancel may be a function of canceling service information with respect to the corresponding EMBMS user service and the EMBMS bearer service when the service provider no longer provides the application service.

The service provider server 300 includes a service registration and cancel module 320, a channel establishment and cancel request processing module 330, a message receiving module 340, a content production module 350, and a content transmission module 360.

In operation 301, the service registration and cancel module 320 may perform registration and canceling with respect to the EMBMS user service and the EMBMS bearer service through an eBM-SC 400 functioning to control the EMBMS service and a designated interface.

In a structure of the mobile communication system, when the eBM-SC 400 does not include the service registration and cancel function, and includes a separate component or node performing the registration and cancelation of the service, the service registration and cancel module 320 may be directly connected with the separated component to thereby perform a service registration and cancel operation.

In operation 301, when registering the EMBMS user service, the service registration and cancel module 320 may transmit, to the eBM-SC 400, EMBMS user service information including at least one of a service name, a type and characteristics of contents to be transmitted through the EMBMS user service, and a participant list using a corresponding EMBMS user service.

In operation 301, when performing the service registration procedure from the eBM-SC 400 in response to the registration request for the EMBMS user service, the service provider server 300 may receive the allocated service ID, that is, inherent user service ID used for identifying a corresponding service, and a result obtained by performing the EMBMS user service registration procedure.

When canceling the EMBMS user service, the service provider server 300 may request the eBM-SC 400 to cancel the user service, using the user service ID.

When receiving the cancel request of the EMBMS user service from the service provider server 300, the eBM-SC 400 may collect all resources allocated to the corresponding EMBMS user service, delete all information, and return the deleted result. In this instance, the returning of the result may be omitted.

The cancel request with respect to the EMBMS user service may be performed based on a determination of the service provider such that the EMBMS service is no longer provided. In this instance, the EMBMS bearer service included in the corresponding EMBMS user service may be also canceled.

The service registration/cancel module 320 may request the eBM-SC 400 for registration and cancelation with respect to the EMBMS bearer service according to the establishment and cancel request of the chatting channel from the UE 500.

In addition, when receiving the establishment and cancel request of the chatting channel from the UE 500 in operation 303, the service registration and cancel module 320 receives a request for the registration and cancel with respect to the EMBMS bearer service from the channel establishment and cancel request processing module 330 to thereby perform the registration and cancel request procedure 305 of the EMBMS bearer service, and receive a response of the registration and cancel request procedure 305 from the eBM-SC 400.

In the case of the EMBMS bearer service registration, the service registration and cancel module 320 may transmit, to the eBM-SC 400, first bearer service information including at least one of a user service ID for identifying the EMBMS user service, a name of the EMBMS bearer service, a type of data to be transmitted through the EMBMS bearer service, information on a service area to which the EMBMS bearer service is applied, and a service type indicator instructing to perform a real-time EMBMS bearer activation procedure.

As a result, in operation 301, the user service registration and cancel module 320 may receive, from the eBM-SC 400, second bearer service information including a bearer service ID with respect to the corresponding EMBMS bearer service, and information about an IP multicast address and a port for the EMBMS bearer service.

In the case of the user service cancel, the user service registration and cancel module 320 may request a cancel using the user service ID and the bearer service ID, and return the requested result from the eBM-SC 400. In this instance, a procedure of returning the requested result may be omitted.

When receiving the establishment and cancel request of the chatting channel from the UE 500 at an arbitrary point in time in operation 303, the channel establishment and cancel request processing module 330 may generate and delete information required for managing the respective chatting channels within the service provider server 300, and process internal functions for the EMBMS user service.

In operation 305, the channel establishment and cancel request processing module 330 may request the user service registration and cancel module 320 about the registration and cancel with respect to the EMBMS bearer service for the purpose of the registration and cancel of the EMBMS multicast bearer. Here, requesting, by the channel establishment and cancel request processing module 330, the user service registration and cancel module 320 for registration and cancelation with respect to the EMBMS bearer service is to unify a module interlocked with the eBM-SC 400. Otherwise, in operation 307, the channel establishment and cancel request processing module 330 may be directly interlocked with the eBM-SC 400.

In this instance, on the assumption that the mobile subscriber is participating in all chatting channels, registration with respect to the EMBMS multicast bearer service for mobile communication subscribers may be carried out every time establishment of the chatting channel is requested by the user.

When participation of the mobile subscriber is permitted with respect to the chatting channel having a specific condition according to the service provider, standard establishment and application for the permission may be performed in an application program for controlling the chatting service of the service provider server 300.

In operation 309, when the EMBMS multicast bearer setting for data transmission is completed, the UEs 500 may transmit and receive communication messages to and from each other through a corresponding chatting channel, and the communication messages from the UE 500 inputting the communication messages may be uploaded.

The message receiving module 340 may classify the communication messages uploaded from the UE 500 for each chatting channel. That is, the communication messages may be collected in the message receiving module 340, and the collected communication messages may be classified for each chatting channel. When at least one of the mobile subscriber is included in the participant list in receiving data traffic from the UE 500, the message receiving module 340 may determine the data traffic to be transmitted to the mobile communication network.

The determination standard for the traffic transmission to the mobile communication network may be used as operation information for operating the service provider server, and different values according to an operation standard of an application program within the service provider server may be applied to the determination standard.

In operation 311, the communication messages classified in the message receiving module 340 may be transmitted to the content production module 350, and the content production module 350 may produce the classified communication messages as a multicast packet or a unicast packet according to a type defined in the eBM-SC 400. For example, the classified communication messages may be produced as the multicast packet using a multicast address allocated to a corresponding channel, or produced as the unicast packet simply including a corresponding chatting channel ID and having the eBM-SC 400 as a destination.

When the IP multicast address and port is required to transmit the classified communication messages using the multicast packet, the content production module 350 may utilize information received from the eBM-SC 400 through the response to the registration of the EMBMS bearer service.

When the classified communication messages are transmitted using the unicast packet, the content production module 350 may be interlocked with the channel establishment and cancel request processing module 330 to obtain a corresponding chatting channel ID in operation 313.

When the content production module 350 transmits, to the content transmission module 360, a data packet to be transmitted to a corresponding EMBMS multicast bearer for each of the EMBMS service in operation 315, the content transmission module 360 may transmit corresponding contents, that is, contents in a multicast packet or unicast packet type, according to a method described in the eBM-SC 400.

In this instance, when a generated packet is an IP multicast packet, the generated packet may be directly transmitted to the eBM-SC 400, or encapsulated to a unicast packet having the eBM-SC 400 as a destination to be transmitted.

Figure 4:
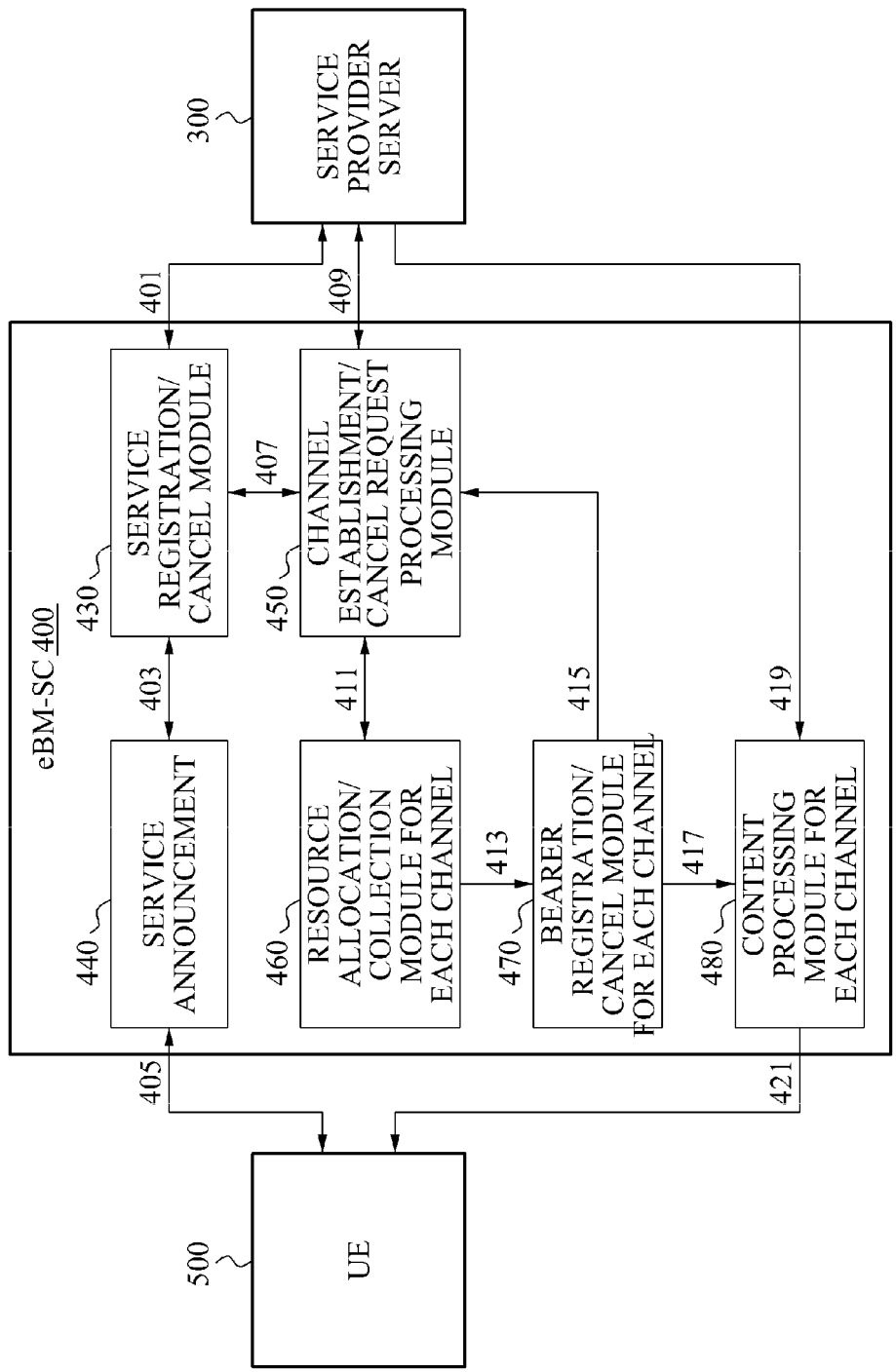
FIG. 4 is a block diagram illustrating an Evolved Broadcast Multicast Service Center (eBM-SC) according to an embodiment of the present invention.

FIG. 4 is a block diagram illustrating an eBM-SC according to an embodiment of the present invention.

Referring to FIG. 4, the eBM-SC 400 includes a service registration and cancel module 430, a service announcement module 440, a channel establishment and cancel request processing module 450, a resource allocation and collection module for each channel 460, a bearer registration and cancel module for each channel 470, and a content processing module for each channel 480.

The service registration and cancel module 430 may register and cancel an EMBMS user service and an EMBMS bearer service to be provided to at least one of a UE, using an EMBMS multicast bearer service.

The service registration and cancel module 430 may receive an information registration and cancel request with respect to the EMBMS user service and the EMBMS bearer service, and allocate or collect an ID, an IP multicast address, and a port resource.

In addition, the service registration and cancel module 430 may store or delete information about the user and the bearer service in a DB, and transmit, to the service provider server 300, resource information allocated to the eBM-SC 400. In this instance, information stored in the DB may be used for announcement or authorization with respect to the EMBMS multicast bearer service, configuration of a multicast tree, an EMBMS multicast bearer activation/deactivation procedure, and an EMBMS signal procedure and traffic transmission procedure such as traffic session control.

The service registration and cancel module 430 may perform registration of a corresponding service at an arbitrary point in time before a corresponding EMBMS user service starts, and the registration in an off-line or on-line type may be performed.

In this instance, in operation 401, the service provider server 300 may transmit, to the eBM-SC 400, service information such as a service name, a type and characteristics of contents to be transmitted through a service, a participant list using a corresponding service, and the like.

When the service provider server 300 is determined to provide the EMBMS user service no longer, the service registration and cancel module 430 may request cancel with respect to the corresponding EMBMS user service using a corresponding user service ID.

When receiving the cancel request with respect to the corresponding EMBMS user service, the eBM-SC 400 may collect all resources associated with the corresponding service, and delete information.

According to the standard, the eBM-SC 400 may transmit, to a plurality of unspecified mobile terminals, summary information with respect to the EMBMS user service by the service announcement module 440, thereby enabling users of the UE to select a desired service.

When the registration with respect to the EMBMS user service and the EMBMS bearer service is completed, a multi-chatting channel service may also transmit corresponding service information to the UE 500 using the above described functions in operation 405. In this instance, the service announcement module 440 may be interlocked with the service registration and cancel module 430 in operation 403, and generate Service Description Protocol (SDP) files based on the information stored in the DB of the service registration and cancel module 430 to thereby perform, on the UE 500, announcement with respect to the EMBMS bearer service in operation 405.

When an arbitrary UE requests establishment of the chatting channel, the service provider server 300 may request the eBM-SC 400 for registration of a corresponding EMBMS bearer service in operation 409.

In this instance, the service provider server 300 may transmit, to the channel establishment and cancel request processing module 450, first bearer service information including at least one of a name of the EMBMS bearer service, a type of data to be transmitted through the EMBMS bearer service, information about a service area to which the EMBMS bearer service is applied, and a service type indicator instructing to perform a real-time EMBMS bearer activation procedure, together with the user service ID for identifying the EMBMS user service received from the eBM-SC 400 in operation 401.

The channel establishment and cancel request processing module 450 may process the registration and cancel request of the EMBMS bearer service received from the service provider server in response to the establishment and cancel request of the chatting channel from the UE.

The channel establishment and cancel request processing module 450 may be a module controlling an interface with the external service provider server 300 in the mobile communication system, and perform certification with respect to the registration and cancel request of the EMBMS bearer service and verification with respect to the inputted data to thereby determine whether the registration and cancel with respect to the EMBMS bearer service is performed.

In this instance, the channel establishment and cancel request processing module 450 may be interlocked with the service registration and cancel module 430 to refer to the user service information in which the corresponding EMBMS bearer service is included in operation 407, and request the resource allocation and collection module for each channel 460 about allocation and collection of resources for each channel so as to generate and delete information required for the EMBMS multicast bearer setting in operation 411.

When the resource allocation and collection for the EMBMS multicast bearer setting is determined in the channel establishment and cancel request processing module 450, the resource allocation and collection module for each channel 460 may allocate resources to be used by each of the EMBMS multicast bearers, or collect resources of which usage is completed.

The resource allocation and collection module for each channel 460 may generate second bearer service information allocated to set the EMBMS bearer service, and allocate a resource for the EMBMS bearer service.

The resource allocation and collection module for each channel 460 may perform allocation with respect to the user service ID, the bearer service ID, the ID multicast address and port for each of the bearer services, and temporary mobile group identity (TMGI) to be used in a control section of the mobile communication network, at the time of the registration of the EMBMS user service and the EMBMS bearer service.

The bearer registration and cancel module for each channel 470 may perform the EMBMS multicast bearer setting in real-time using at least one of the user service information for the EMBMS bearer service, the first bearer service information, the second bearer service information, and internal information required for the bearer setting. The internal information required for the bearer setting may be information about an inherent function of eBM-SC and thus, will not be separately described.

The bearer registration and cancel module for each channel 470 may perform a procedure for the corresponding EMBMS multicast bearer setting immediately when the resource allocation is completed. The procedure for the EMBMS multicast bearer setting may be processed by an organic operation of nodes of the mobile communication system configuring the EPC and E-UTRAN based on the eBM-SC in operation 413, and use information allocated in the resource allocation and collection module for each channel 460.

The resource allocation and collection module for each channel 460 may delete information about the corresponding EMBMS user service from various information tables and the DB using the user service ID provided by the service provider server 300 at the time of canceling, and perform a cancel procedure of the EMBMS multicast bearer through the bearer registration and cancel module for each channel 470. In this instance, the resource allocation and collection module for each channel 460 may be interlocked with the EPC and the E-UTRAN based on the eBM-SC, and the collection of the resources allocated to each of the nodes and information deletion may be performed.

When the EMBMS multicast bearer setting is completed, the communication messages received from the service provider server 300 may be transmittable, the eBM-SC 400 may inform the service provider server 300 through the channel establishment and cancel request processing module 450 about that the corresponding chatting channel is prepared to be used, in operations 409 AND 415.

Thereafter, the content processing module 480 for each chatting channel 480 may receive, from the service provider server 300, the communication message uploaded by the users in operation 419, and transmit, to the UE, the communication message uploaded from UE 500 in operation 421 using the EMBMS multicast to which the corresponding communication message is transmitted among the EMBMS multicast bearers generated in the bearer registration and cancel module for each channel 470 receiving the uploaded communication message.

Figure 5:
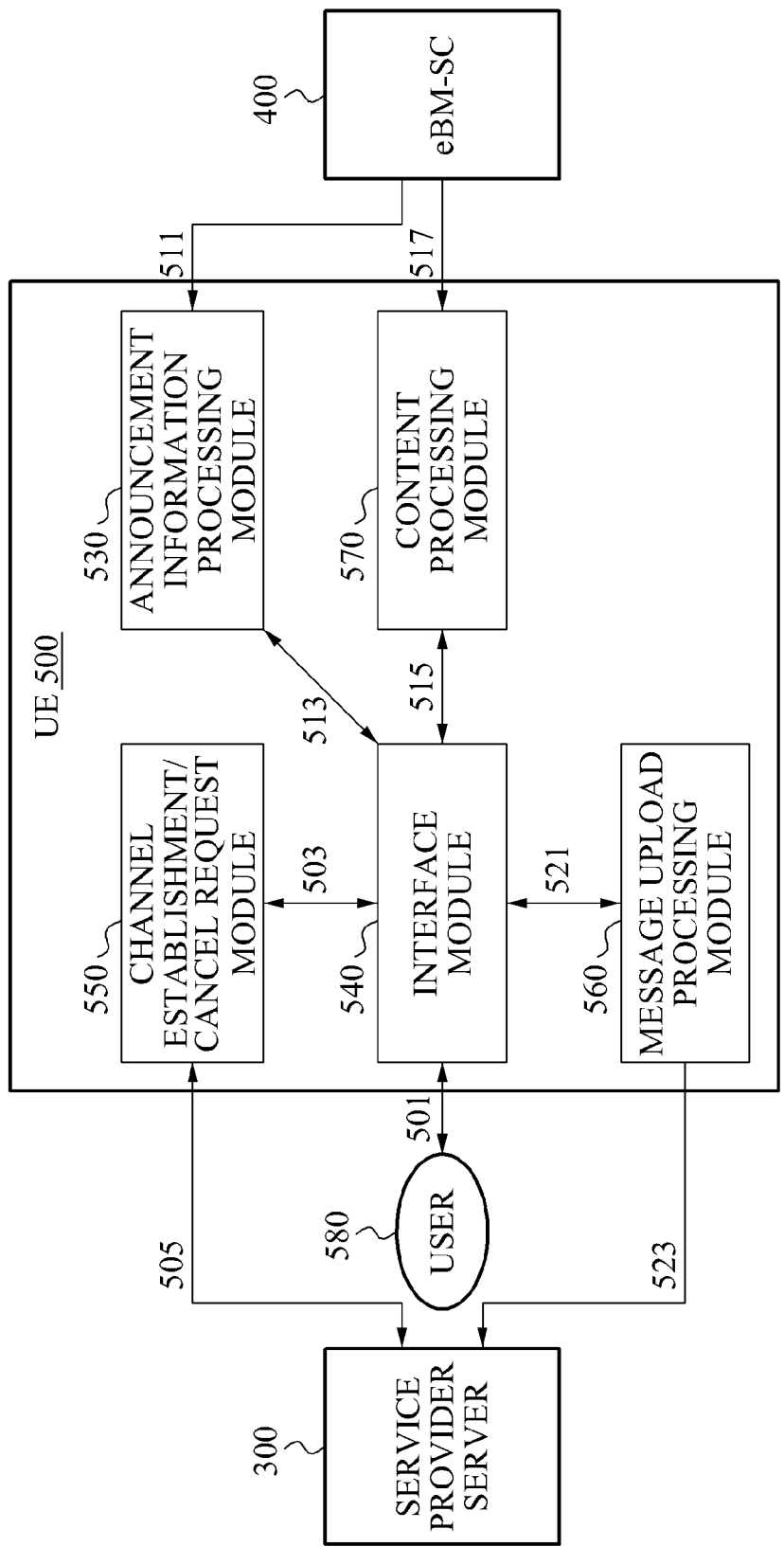
FIG. 5 is a block diagram illustrating a user equipment (UE) according to an embodiment of the present invention.

FIG. 5 is a block diagram illustrating a UE 500 according to an embodiment of the present invention.

Referring to FIG. 5, the UE 500 may be a mobile terminal having the EMBMS service capability, and include functions required for supporting the multi-chatting channel service, inherent functions of the UE, or other functions for providing other services.

The UE 500 includes an announcement information processing module 530, an interface module 540, a channel establishment and cancel request module 550, a message upload module 560, and a content processing module 570.

A mobile communication service user 580 may request establishment and canceling of the chatting channel in which a plurality of participants participant while using a specific service or in a separate service type, using the UE 500 of the mobile communication service user 580. The user's request may be performed through the interface module 540 mounted in the UE 500.

In operation 505, the channel establishment and cancel request module 550 may request the service provider server 300 for establishment and canceling of the chatting channel.

In operation 505, the channel establishment and cancel request module 550 may perform management for required information and detailed functions in response to the user's request, and transmit the request to the service provider server 300.

In operation 505, when an interlocking between the service provider server 300 and the eBM-SC 400 is performed according to the establishment request for the chatting channel, and the EMBMS multicast bearer to be used for the corresponding chatting channel is secured, the service provider server 300 may inform the channel establishment and cancel request module 550 that the chatting channel is successfully established.

In operation 511, the eBM-SC 400 may transmit information about the corresponding service to the UE 500 through service announcement function of unspecified users.

In operation 501, the transmitted information about the corresponding service may be parsed through the announcement information processing module 530, the parsed information may be subjected to a semantic verification process with respect to each of the information, and then the information may be shown to users through the interface module 540.

The announcement information processing module 530 may receive, from the eBM-SC 400, announcement with respect to the EMBMS bearer service of the chatting channel.

The message upload module 560 may upload the communication message to the service provider server 300 using the chatting channel selected from the chatting channel list included in information acquired through the announcement.

At the time of the request for the chatting channel, a name of the channel designated by the user may be disclosed as a service name. Arbitrary users may participate in conversation through the corresponding chatting channel by selecting the disclosed service name, that is, a name of the chatting channel.

The communication messages inputted through the interface module 540 may be transmitted to the message upload module 560 in operation 521, the transmitted communication messages may be uploaded to the service provider server 300 in operation 523, and then the uploaded communication messages may be transmitted to other users participating in the corresponding chatting channel through the EMBMS multicast bearer of the mobile communication network in operation 517.

In this instance, since equipments of all participants participating in the chatting may receive the same message transmitted through a single radio channel, services may be provided using limited resources even though a number of users participating in the chatting is large.

The communication messages uploaded through the chatting channel by the users may be transmitted through the EMBMS multicast bearer. Next, the content processing module 570 may receive the transmitted communication messages, and transmit the received communication messages to the interface module 540 so that the received communication messages are outputted to a window designated by a chatting client.

When the established chatting channel is determined to be no longer used, the UE 500 may transmit, to the service provider server 300, the cancel request for the corresponding chatting channel to thereby enable cancel of all information and resources allocated for the corresponding channel to be performed in operation 505.

Figure 6:
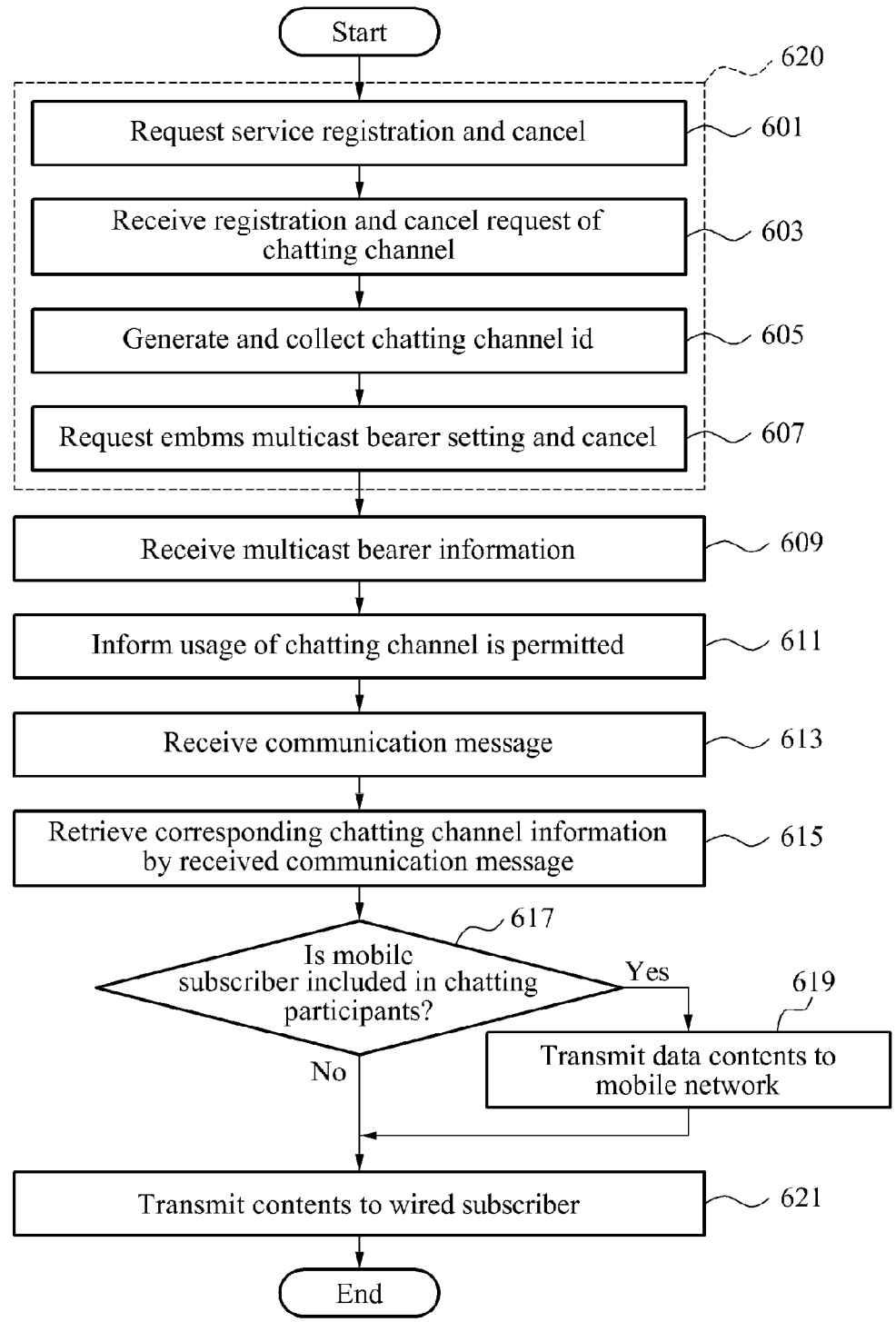
FIG. 6 is a flowchart illustrating a method for controlling a service provider server according to an embodiment.

FIG. 6 is a flowchart illustrating a method for controlling a service provider server according to an embodiment.

Referring to FIG. 6, in operation 601, the service provider server may register a corresponding application service as an EMBMS user service in an eBM-SC at an arbitrary point in time before the corresponding application service starts, so as to provide an application service including a multi-chatting service in which a mobile subscriber and a wired subscriber simultaneously participate, and request cancel of the EMBMS user service when using the corresponding service no longer.

Also, in operation 601, the service provider server may transmit, to the eBM-SC, service information including at least one of a service name, a type and characteristics of contents to be transmitted through the EMBMS user service, and a participant list using a corresponding service at the time of the registration of the user service, and receive an ID of the corresponding EMBMS user service generated when registering the user service.

In operation 603, the service provider server may receive an establishment request for a chatting room, that is, the chatting channel, from a UE, for example, a mobile terminal or wired terminal, desiring to user the multi-chatting service at an arbitrary point in time after the registration of the service.

In operation 605, when receiving the establishment request for the chatting channel of the subscriber, the service provider server may generate and store information such as a chatting channel ID required for operating the corresponding chatting channel, and the like.

In operation 607, the service provider server may request the eBM-SC about registration of the EMBMS bearer service to support participant of the mobile subscribers with respect to the corresponding chatting channel. In this instance, first bearer service information including at least one of the user service ID for identifying the EMBMS user service using the information received from the eBM-SC in operation 601, a name of the EMBMS bearer service, a type of data to be transmitted through the EMBMS bearer service, information about a service area to which the EMBMS bearer service is applied, and a service type indicator instructing to perform a real-time EMBMS bearer activation procedure may be transmitted to the eBM-SC.

As a result, in operation 609, the service provider server may receive, from the eBM-SC, second bearer service information including at least one of a bearer service ID for the EMBMS bearer service to be used to transmit a communication message among participants of the chatting channel, and information on an IP multicast address and a port. In operation 611, the service provider server may receive, from the eBM-SC, a signal indicating that usage for the chatting channel is permitted, so as to transmit and receive the communication message to and from the mobile subscriber through the chatting channel selected by the UE.

Thereafter, in operation 613, the communication message may be uploaded to the service provider server from a user establishing the corresponding chatting channel or other participants.

When the communication message is uploaded from the UE based on the permission of the usage for the chatting channel, the service provider server may retrieve information on the chatting channel to which the received communication message is applied in operation 615, and determine whether the mobile subscriber is included in the participant list to which the communication message is to be transmitted in operation 617.

In this instance, as a method for identifying the mobile subscriber, various methods such as using a separate marker, an inherent ID of the subscriber, or the like may be adopted.

When the mobile subscriber is included in the participant list, the service provider server may transmit, to the eBM-SC, all communication messages included in the corresponding chatting channel in operation 619 so as to transmit the communication message through a mobile communication network. Next, in operation 621, transmission of the communication message may be performed on other remaining wired subscribers. Here, the performed order of operations 619 and 621 may be reversed.

When the usage of the established chatting channel is completed, the service provider server may receive a cancel request from the UE in operation 603, and request the eBM-SC to cancel the EMBMS bearer service using an ID of the corresponding chatting channel.

The cancel request of the user service may be performed by a determination of the service provider such as providing services no longer. In this instance, it is necessary that the EMBMS bearer services included in the corresponding user service have been previously canceled so that no service to be provided exists. That is, functions associated with the cancel of FIG. 6 may correspond to procedures shown in a box of operation 620, and operations 603, 605, 607, and 601 may be sequentially performed.

Figure 7:
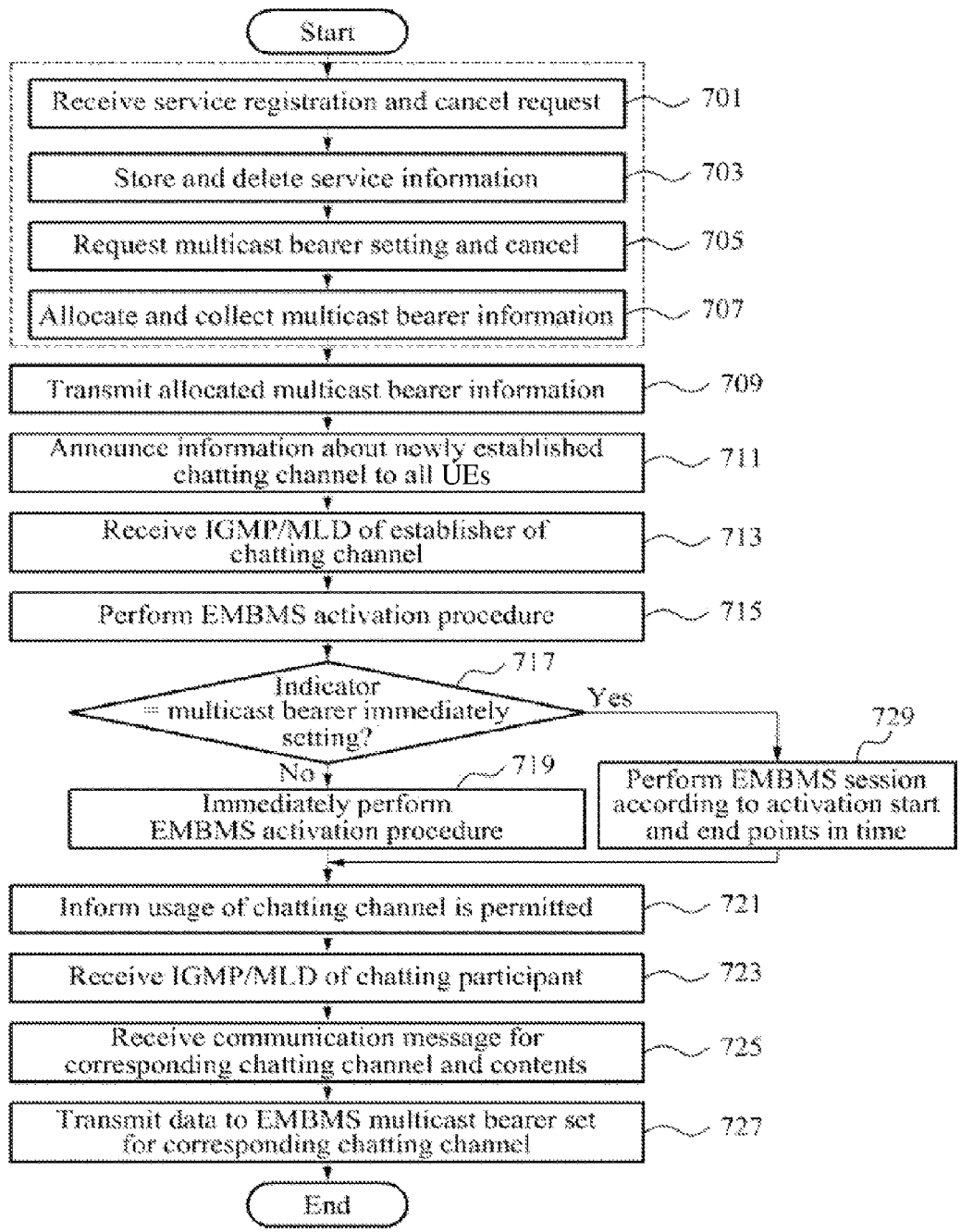
FIG. 7 is a flowchart illustrating a method for controlling an eBM-SC according to an embodiment.

FIG. 7 is a flowchart illustrating a method for controlling an eBM-SC according to an embodiment.

Referring to FIG. 7, when receiving, the service provider server, service information including a registration request for the EMBMS user service and a service type indicator for the EMBMS user service in operation 701, the eBM-SC may generate a user service ID for identifying the EMBMS user service, and transmit the generated user service ID to the service provider server. In this instance, in operation 703, the eBM-SC may store the generated service ID and the corresponding information in a DB, and designate and store a service type for the service information.

The above described process may be performed by an on-line or off-line operation between the service provider server and the eBM-SC at an arbitrary point in time before the corresponding service starts.

When receiving, from the UE, an establishment request for a specific chatting channel later, the service provider server may request the eBM-SC about a setting of the MEMBS bearer service in operation 705, and the eBM-SC may generate second bearer service information required for providing the EMBMS bearer service, that is, required for setting the EMBMS multicast bearer to be used for the corresponding chatting channel, and allocate resources for the EMBMS bearer service in operation 707.

The eBM-SC may also store the generated second bearer service information in the DB, and transmit the stored second bearer service information to the service provider server in operation 709. The second bearer service information may include at least one of information on a bearer service ID for the EMBMS bearer service used to transmit the communication message among participants of the chatting channel, and information on an IP multicast address and a port.

In operation 711, the eBM-SC may create an SDP file using the acquired information to thereby perform announcement for the EMBMS bearer service on the UE.

The UE may obtain information about which chatting channel is available through the above described operations, and select a desired chatting channel to use a corresponding service.

When a user requesting a setting of the corresponding chatting channel selects the chatting channel service generated by the UE, among services specified in an EMBMS client of the UE, the EMBMS client may internally transmit, to the eBM-SC, IGMP, and in a case of IPv6 environment, MLD, of a multicast join message in operation 713.

The multicast join message received from the UE selecting the chatting channel desired to participant in based on information acquired through the announcement with respect to the EMBMS bearer service may be transmitted to the eBM-SC via the MBMS2 of FIG. 1 to thereby perform an EMBMS activation procedure in operation 715.

In this instance, so that the UE may receive the communication message using the EMBMS multicast bearer set by the EMBMS bearer service, the eBM-SC may respond to the multicast join message received from the UE to thereby perform the EMBMS activation procedure using the EMBMS multicast bearer information in which the user service information, the first bearer service information, and the second bearer service information are integrated. Accordingly, the eBM-SC may transmit the communication message to the UE through the EMBMS multicast bearer.

Here, the EMBMS activation procedure may be performed through an MBMS2, an eNodeB, and the UE by a signaling procedure defined in the 3GPP standard. The EMBMS activation procedure may configure a multicast tree designating a transmission path for multicast transmission, and may be a procedure of designating information about nodes on a path in which a corresponding bearer is set later, which is different from designating a path to which actual data is transmitted.

In general, the EMBMS activation procedure may be performed regardless of an EMBMS start procedure for a bearer setting performed at a point in time when actual traffic is to be transmitted.

In a group chatting service environment according to an embodiment, to set a corresponding bearer immediately after performing the EMBMS activation procedure, the eBM-SC may immediately perform an EMBMS session procedure based on the service type indicator included in the first bearer service information in operations 717 and 719.

Here, the first bearer service information may include at least one of a user service ID for identifying the EMBMS user service, a name of the EMBMS bearer service, a type of data to be transmitted through the EMBMS bearer service, information about a service area to which the EMBMS bearer service is to be applied, and a service type indictor instructing to perform a real-time EMBMS bearer activation procedure.

The service type indicator may be an indicator indicating it is necessary to perform a procedure of setting the EMBMS multicast bearer immediately after registering the EMBMS bearer service.

When the service type indicator instructs to perform the real-time EMBMS bearer activation procedure, the eBM-SC may immediately perform an EMBMS sessions start procedure in operation 719.

The eBM-SC may designate and store the service type indicator for the user service information.

In operation 719, procedures to allocate actual radio bearer resources by an interlocking among the MBMS2, the eNodeB, and the UE of the eBM-SC, and to inform that traffic transmission is immediately performed may be performed. When the procedures are completed, the chatting channel requested by an actual user may perform mutual communication, and the eBM-SC may inform the service provider server about that usage of the chatting channel is permitted, in operation 721.

When the operation 721 is completed, the communication message of a participant may be transmitted and received in a state where the corresponding chatting channel service is activated.

When the service type indicator does not instruct to perform the real-time EMBMS bearer activation procedure in operation 717, the eBM-SC may perform, in operation 719, the EMBMS session procedure according to predetermined activation start and end points in time, which is different from being immediately performed.

Thereafter, arbitrary users may participate in the corresponding chatting channel. When the user, that is, the mobile subscriber selects and registers the chatting channel desired to participate in based on information acquired through the announcement with respect to the EMBMS bearer service, the eBM-SC may receive, from the UE, the multicast join message such as IGMP or MLD in operation 723, similar to in operation 713.

In the UE, a chatting window may be opened through an EMBMS client or an application service client for the chatting, so that the communication messages may be transmitted and received.

Accordingly, the eBM-SC may receive, from the service provider server receiving the communication message inputted by the user, the communication message, contents, and the like with respect to the chatting channel selected by the user in operation 725, and transmit, in operation 727, the received communication message, contents, and the like through the EMBMS multicast bearer set in operation 719.

A service cancel procedure inputted from the service provider server may correspond only to operations 701, 703, 705, and 707 of FIG. 7.

Since the cancel of the EMBMS user service is performed after all EMBMS bearer services are canceled, operations 705 and 707 may be previously performed, and then operations 701 and 703 may be performed.

Figure 8:
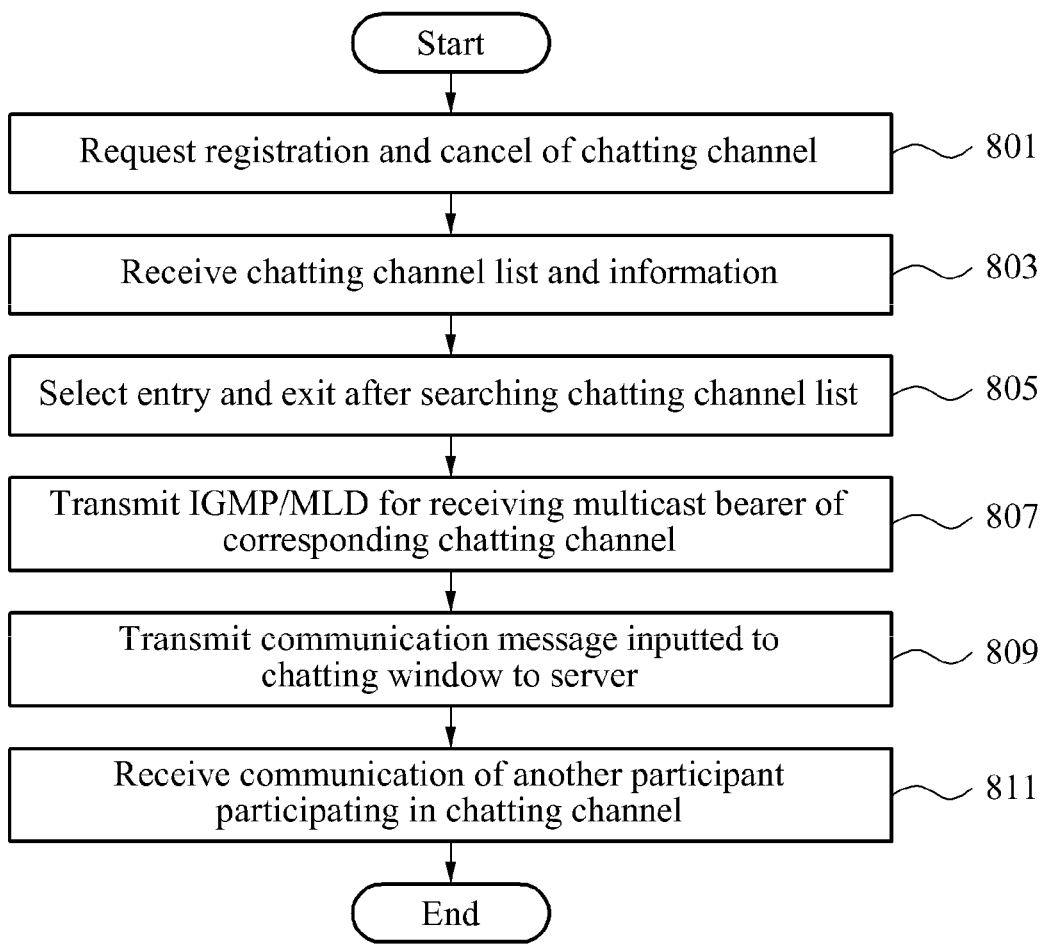
FIG. 8 is a flowchart illustrating a method for controlling a UE according to an embodiment.

FIG. 8 is a flowchart illustrating a method for controlling a UE according to an embodiment.

Referring to FIG. 8, in operation 801, the UE may request the service provider server about establishment for the chatting channel so as to user an application service including a multi-chatting service in which a mobile subscriber and a wired subscriber simultaneously participate. Thereafter, when receiving, from the eBM-SC providing an EMBMS service for the chatting channel, announcement with respect to an EMBMS bearer service in operation 803, the UE may select a chatting channel desired to participate in from a chatting channel list based on information acquired through the announcement in operation 805.

The eBM-SC may transmit a multicast join message to use the EMBMS bearer service for the selected chatting channel in operation 807, and when an EMBMS session procedure is completed in the eBM-SC based on the multicast join message, the eBM-SC may upload, to the service provider server, a communication message inputted to a chatting window in operation 809.

Here, the UE may select the chatting channel based on the information acquired through a service announcement to thereby access a subscriber terminal participating in the chatting and the service provider server, so that a new chatting channel may be established and canceled.

In the former case, the UE may not perform the operation 801 of establishing and canceling the chatting channel, retrieve the chatting channel list based on the information acquired in operation 803 through the announcement with respect to the EMBMS bearer service from the eBM-SC, and select a desired chatting channel from the chatting channel list, thereby reporting about intension of the user to participate in the corresponding chatting channel in operation 805.

An application service client of the UE that recognizes the intension of the user through a user interface may perform a multicast join message (IGMP/MLD) transmission for the purpose of receiving traffic from the EMBMS multicast bearer to which the communication messages of the corresponding chatting channel are transmitted. In operation 811, when the UE transmits the multicast join message, the eBM-SC may perform a session start procedure for resource allocation of the EMBMS bearer service, and obtain information about a radio channel through which actual data is transmitted, thereby obtaining a state where data may be received.

In the state where the data is received, when the user inputs the communication message, the application service client may transmit, to the service provider server, a data packet in which corresponding messages are included, in operation 809. The messages may be transmitted to other users participating in the corresponding chatting channel by the service provider server. Operations 809 and 811 may be reversed.

In addition, in operation 801, the user intending to establish a chatting channel may request the service provider server about establishment for the chatting channel. In operation 803, the user may receive, from the eBM-SC providing the EMBMS bearer service with respect to the chatting channel, announcement with respect to the EMBMS bearer service for the chatting channel requested by the user. Thereafter, in operation 805, the UE may select the corresponding channel.

Accordingly, the application service client may transmit the multicast join message to perform a data transmission path registration and a radio resource allocation, thereby obtaining a state where the chatting communication messages may be transmitted and received. In the state where the communication messages are transmitted and received, the communication message inputted by the user may be uploaded to the service provider server in operation 809, and communication messages of other users may be received through the eBM-SC.

When the transmission and reception of the communication messages are completed, an establisher of the chatting channel may request the service provider server to cancel the chatting channel and may also cancel the resource allocated to the corresponding channel.

The method according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for providing an Evolved Multimedia Broadcast/Multicast Service (EMBMS) chatting service for providing a multi-chatting service, the system comprising:
    at least one of a User Equipment (UE) to request establishment of a chatting channel and to transmit and receive a communication message and contents so as to transmit and receive the communication message with a plurality of mobile subscribers participated in the chatting channel;
    an evolved Broadcast Multicast-Service Center (eBM-SC) to perform control of an EMBMS service so as to transmit the communication message to the at least one of the UE using the EMBMS service; and
    a service provider server to transmit, to the eBM-SC, user service information, first bearer service information, and contents for each of one or more chatting channels that include the chatting channel, each being required for the control of the EMBMS service, so that the at least one of the UE transmits and receives the communication message with the plurality of the mobile subscribers participated in the chatting channel.

2. The system for providing the EMBMS chatting service of claim 1, wherein the at least one of the UE is configured to:
    request the service provider server about establishment and canceling of the chatting channel;
    receive, from the eBM-SC, an announcement about an EMBMS bearer service for the chatting channel; and
    upload the communication message to the service provider server using the chatting channel selected from a chatting channel list comprised in information acquired through the announcement.

3. The system for providing the EMBMS chatting service of claim 1, wherein the eBM-SC is configured to:

register and cancel an EMBMS user service and an EMBMS bearer service, each desired to be provided to the at least one of the UE using the EMBMS service;

perform an announcement about the EMBMS service on the UE by generating Service Description Protocol (SDP) files based on information stored based on registering or canceling the EMBMS user service and the EMBMS bearer service;

process a registration and cancel request of the EMBMS bearer service received from the service provider server in response to an establishment and cancel request of the chatting channel from the UE;

generate, for each of the one or more chatting channels, second bearer service information allocated for setting the EMBMS bearer service, allocate a resource for the EMBMS bearer service;

perform, for each of the one or more chatting channels, an EMBMS multicast bearer setting in real-time using the user service information for the EMBMS bearer service, the first bearer service information, and the second bearer service information; and transmit, for each of the one or more chatting channels, to the UE, the communication message uploaded from the UE using the EMBMS multicast bearer to which the communication message is transmitted among the EMBMS multicast bearers.

4. The system for providing the EMBMS chatting service of claim 3, wherein the second bearer service information comprises at least one of a bearer service identifier (ID) for the EMBMS bearer service, and information on an internet protocol (IP) address and a port for the EMBMS bearer service.

5. The system for providing the EMBMS chatting service of claim 1, wherein the service provider is configured to:

request the eBM-SC for establishment and cancelation of the EMBMS bearer service in response to a request for establishment and cancelation of the chatting channel from the UE;

create and delete information required for managing the chatting channel in response to the request for the establishment and cancelation of the chatting channel;

classify the communication messages uploaded from the UE for each of the one or more chatting channels;

produce the classified communication messages as a multicast packet or an unicast packet; and transmit, to the eBM-SC, the multicast packet or the unicast packet.

6. A method for controlling a service provider server, comprising:

requesting an evolved Broadcast Multicast-Service Center (eBM-SC) to register, as an Evolved Multimedia Broadcast/Multicast Service (EMBMS) user service, an application service comprising a multi-chatting service in which a mobile subscriber and a wired subscriber participate;

receiving an establishment request for a chatting channel from a User Equipment (UE) desiring to use the multi-chatting service;

requesting the eBM-SC to register an EMBMS bearer service to support participation of one or more mobile subscribers including the mobile subscriber with respect to the chatting channel;

receiving, from the eBM-SC, second bearer service information comprising at least one of a bearer service identifier (ID) for the EMBMS bearer service, and an internet protocol (IP) address and port for the EMBMS bearer service, the second bearer service information allocated for an EMBMS multicast bearer setting for the EMBMS bearer service; and receiving, from the eBM-SC, a signal informing that usage for the chatting channel is permitted so as to transmit and receive a communication message with the mobile subscriber through the chatting channel selected by the UE.

7. The method for controlling the service provider server of claim 6, wherein the requesting of the eBM-SC to register as the EMBMS user service comprises transmitting, to the eBM-SC, service information comprising at least one of a service name, a type and characteristics of contents transmitted through the EMBMS user service, and a participant list to use a corresponding service.

8. The method for controlling the service provider server of claim 6, further comprising:

determining whether the mobile subscriber is comprised in a participant list in which the communication message is to be transmitted when the communication message is uploaded from the UE according to permission of usage with respect to the chatting channel; and transmitting, to the eBM-SC, the communication message involved in a corresponding chatting channel so as to transmit the communication message through a mobile communication network when the mobile subscriber is comprised in the participant list.

9. The method for controlling the service provider server of claim 6, wherein the second bearer service information received from the eBM-SC comprises at least one of information on the bearer service ID for the EMBMS bearer service used to transmit the communication message among participants of the chatting channel, and information on a multicast IP address and port.

10. The method for controlling the service provider server of claim 6, wherein the requesting of the eBM-SC to register the EMBMS bearer service comprises transmitting, to the eBM-SC, first bearer service information comprising at least one of a user service ID for identifying the EMBMS user service, a name of the EMBMS bearer service and a type of data to be transmitted through the EMBMS bearer service, information on service area to which the EMBMS bear service is to be applied, and a service type indicator instructing to perform a real-time EMBMS bearer activation procedure.

11. The method for controlling the service provider server of claim 10, further comprising:

requesting cancelation with respect to a corresponding EMBMS bearer service using the user service ID and an EMBMS bearer service ID when receiving a cancel request with respect to the chatting channel from the UE.

12. A method for controlling an evolved Broadcast Multicast-Service Center (eBM-SC), comprising:

receiving, from a service provider server, first bearer service information for a request for registration of an Evolved Multimedia Broadcast/Multicast Service (EMBMS) bearer service and the EMBMS bearer service, in response to a request for establishment of a chatting channel from a User Equipment (UE);

generating second bearer service information required for providing the EMBMS bearer service, and allocating a resource for the EMBMS bearer service;

performing an EMBMS activation procedure using EMBMS multicast bearer information in which user service information, the first bearer service information, and the second bearer service information are integrated so that the UE receives a communication message using the EMBMS bearer service;

performing an EMBMS session procedure based on a service type indicator comprised in the first bearer service information; and informing the service provider server that usage of the chatting channel is permitted.

13. The method for controlling the eBM-SC of claim 12, further comprising:

receiving a request for registration of an EMBMS user service from the service provider server, before the requesting to register the EMBMS bearer service; and generating a user service ID for identifying the EMBMS user service and transmitting the generated user service ID to the service provider server, before the requesting to register the EMBMS bearer service.

14. The method for controlling the eBM-SC of claim 12, further comprising:

performing announcement for the EMBMS service on the UE;

receiving a multicast join message from an equipment of a user selecting the chatting channel in which the user is to participate, based on information acquired through the announcement for the EMBMS service;

receiving the communication message with respect to the chatting channel in which the user selects, from the service provider server; and transmitting the communication message to the equipment of the user through an EMBMS multicast bearer set by the EMBMS bearer service.

15. The method for controlling the eBM-SC of claim 14, wherein the performing of the EMBMS activation procedure performs the EMBMS activation procedure in response to the multicast join message received from the UE.

16. The method for controlling the eBM-SC of claim 12, wherein the first bearer service information comprises at least one of a user service ID for identifying an EMBMS user service, a name of the EMBMS bearer service, a type of data transmitted through the EMBMS bearer service, information on a service area to which the EMBMS bearer service is applied, and the service type indicator instructing to perform a real-time EMBMS bearer activation procedure.

17. The method for controlling the eBM-SC of claim 12, further comprising:

transmitting the second bearer service information to the service provider server, wherein the second bearer service information comprises at least one of a bearer service ID for the EMBMS bearer service used to transmit the communication message among participants of the chatting channel, and information on an IP multicast address and a port.

18. The method for controlling the eBM-SC of claim 12, further comprising:

designating the service type indicator with respect to the user service information, and storing the designated service type indicator, wherein the service type indicator is an indicator indicating that it is necessary to perform an EMBMS multicast bearer setting procedure immediately after registering the EMBMS bearer service.

19. A method for controlling a User Equipment (UE), comprising:

requesting a service provider server for establishment with respect to a chatting channel to use an application service comprising a multi-chatting service that supports mobile subscriber and wired subscriber participation;

receiving an announcement with respect to an Evolved Multimedia Broadcast/Multicast Service (EMBMS) bearer service from an evolved Broadcast Multicast-Service Center (eBM-SC) providing an EMBMS service for the chatting channel; and uploading a communication message to the service provider server by selecting a chatting channel desired to participate in from a chatting channel list based on information acquired through the announcement.

20. The method for controlling the UE of claim 19, wherein the uploading of the communication message comprises:

selecting the chatting channel desired to participate in by retrieving the chatting channel list comprised in information acquired through the announcement;

transmitting a multicast join message to the eBM-SC to use the EMBMS bearer service with respect to the chatting channel; and uploading the communication message to the service provider server when an EMBMS session procedure is performed in the eBM-SC based on the multicast join message.

* * * * *